United States Patent [19]
Harrison et al.

[11] Patent Number: 5,893,668
[45] Date of Patent: Apr. 13, 1999

[54] METHOD FOR OPTIMIZING FONT MARKING

[75] Inventors: Michael E. Harrison, Chillicothe; Jean Lee, Circleville, both of Ohio

[73] Assignee: Telesis Technologies, Inc., Circleville, Ohio

[21] Appl. No.: 08/887,201

[22] Filed: Jul. 2, 1997

Related U.S. Application Data

[60] Provisional application No.60/021,105, Jul. 2, 1996.

[51] Int. Cl.$^6$ .................................................. B41J 1/16
[52] U.S. Cl. ..................... 400/127; 400/279; 101/93.04; 395/104
[58] Field of Search ................................ 400/127, 129, 400/130, 124.02, 279, 70, 74; 101/93.04; 395/104, 105, 102, 103, 108

[56] References Cited

U.S. PATENT DOCUMENTS

| | | | |
|---|---|---|---|
| 3,710,319 | 1/1973 | Miller et al. | 382/202 |
| 3,714,631 | 1/1973 | Deschenes | 382/226 |
| 4,180,800 | 12/1979 | Isshiki et al. | 382/196 |
| 4,232,290 | 11/1980 | Yasuda et al. | 382/187 |
| 4,379,283 | 4/1983 | Ito et al. | 382/194 |
| 4,591,279 | 5/1986 | Speicher | 400/127 |
| 4,747,706 | 5/1988 | Duea | 400/70 |
| 4,809,342 | 2/1989 | Kappner | 382/142 |
| 5,052,044 | 9/1991 | Gaborski | 382/170 |
| 5,316,397 | 5/1994 | Robertson et al. | 400/127 |

FOREIGN PATENT DOCUMENTS

| | | | |
|---|---|---|---|
| 60-61284 | 4/1985 | Japan | 400/127 |
| 1-180090 | 1/1989 | Japan | 400/130 |

*Primary Examiner*—Christopher A. Bennett
*Attorney, Agent, or Firm*—James R. Eley, Esq.

[57] ABSTRACT

Method for optimizing the print path of an articulated marking head during the application of a data string of segmented characters. The controlling program which implements the optimized marking head sequence provides for skipping unused line segments within a given data string, thus eliminating unnecessary marking head travel and lessening print cycle time.

7 Claims, 5 Drawing Sheets

| SEGMENTED CHARACTER | BITS/SEGMENTS | | | | | | | | | | | | | | | | HEXADECI-MAL VALUE |
|---|---|---|---|---|---|---|---|---|---|---|---|---|---|---|---|---|---|
| | p | o | m | n | l | k | j | i | h | g | f | e | d | c | b | a | |
| 0 | o | o | o | o | o | o | | | | | | | | | | | 03FF |
| 1 | o | o | o | o | | | o | o | | | o | o | o | | o | o | 0CG4 |
| 2 | | | o | o | o | o | o | o | | | o | | | | o | | C0DD |
| 3 | | o | o | o | o | o | o | o | | | | | | | o | o | 80FC |
| 4 | | | o | o | o | o | o | o | o | o | | | o | o | | o | C032 |
| 5 | | o | o | o | o | | o | o | | | | o | | o | o | o | 84E8 |
| 6 | | | o | o | o | o | o | | | | | o | o | | | | C0E7 |
| 7 | o | o | o | o | o | o | | | o | o | o | o | | | o | o | 030C |
| 8 | | | o | o | o | o | o | o | | | | | | | | | C0FF |
| 9 | | o | o | o | o | o | o | o | o | | | | | | | o | C03E |
| A | | | o | o | o | o | o | o | o | o | | | | | | | C03F |
| B | | | o | o | o | | o | o | | | | | o | o | | | C4E7 |
| C | o | o | o | o | o | o | o | o | | | o | o | | | | | 00CF |
| D | o | o | o | o | | | o | o | | | | | | | o | o | 0CFC |
| E | | | o | o | o | o | o | | | | o | o | | | | | C0CF |
| F | o | | o | o | o | o | o | | o | o | o | o | | | | | 400F |
| G | | o | o | o | o | o | o | | | | | o | | | | | 80EF |
| H | | | o | o | o | o | o | | o | o | | | o | o | | | C033 |
| I | o | o | o | o | | | o | | | | o | o | | | o | o | 0CCC |
| J | o | o | o | o | o | o | o | | | | | | o | o | o | | 00F1 |
| K | o | | o | o | o | | | | o | o | o | o | o | o | | | 5203 |
| L | o | o | o | o | o | o | o | | | | o | o | o | o | | | 00C3 |
| M | o | o | | o | o | o | | o | o | o | | o | | | | | 2233 |
| N | o | o | | o | o | o | o | o | o | | | o | o | | | | 3033 |
| O | o | o | o | o | o | o | o | o | | | | | | | | | 00FF |
| P | | | o | o | o | o | o | o | o | o | o | | | | | | C01F |
| Q | o | o | o | | o | o | o | o | | | | | | | | | 10FF |
| R | | | o | o | o | o | o | o | o | o | o | | | | | | D01F |
| S | | | o | o | o | o | o | o | | | | o | | | | o | CDEE |
| T | o | o | o | o | | | o | | o | o | o | o | | | o | o | 0C0C |
| U | o | o | o | o | o | o | o | o | | | | | o | o | | | 00F3 |
| V | o | o | | | o | o | o | o | o | o | | | o | o | o | o | 3030 |
| W | o | o | o | | | o | o | | o | o | | | o | o | | | 1133 |
| X | o | o | | | o | o | | | o | o | o | o | o | o | o | o | 3300 |
| Y | o | o | | o | | o | | | o | o | o | o | o | | | o | 2A00 |
| Z | o | o | o | o | o | o | | | | o | o | | | | o | o | 03CC |

[o] = OFF (LINE SEGMENT NOT PRESENT; LINE SEGMENT WILL NOT BE PRINTED)

[ ] = ON (LINE SEGMENT PRESENT; LINE SEGMENT WILL NOT BE PRINTED)

METHOD FOR OPTIMIZING FONT MARKING

This application claims the benefit of U.S. Provisional Application Ser. No. 60/021,105 filed Jul. 2, 1996.

BACKGROUND OF THE INVENTION

The present invention relates broadly to marking or printing systems, and particularly to a method for marking the surface of objects with a sequence of indentation-defined or spray-marked segmented characters.

As industry has continued to refine and improve production techniques and procedures, corresponding requirements have been levied for placing machine readable identifying, data related markings upon components of manufactured components. With such marking, the history of a product may be traced throughout the stages of its manufacture and components of complex machinery such as automobiles and the like may be identified, for example, in the course of investigations by governmental authorities. The call for identification, however, not only is concerned with the application of sequential, alphanumeric strings to completed products, but also to component parts of fabrications such as automobiles and piece parts as they may progressing through an industrial process, and to tags which may be attached to these parts.

A variety of product marking approaches have been employed by industry. For example, laser etching and ink and paint spraying of codes, such as dot matrix or segmented characters, have been employed for many manufacturing processes. Where the production environment is too rigorous, however, or subsequent painting steps are involved, such an approach has been found to be unacceptable with more permanent markings being required. Use of lasers to mark the surface of products or other, painted surfaces, has generally failed to overcome these same concerns.

The provision of a permanent or traceable marking upon hard surfaces, such as metals, traditionally has been achieved with marking punches which utilize dies and carry a collection of fully formed characters. These "full face dies" may be positioned in a wheel or ball form of die carrier which is manipulated to define a necessarily short message as it is dynamically struck into the material to be marked. As is apparent, the necessarily complex mechanisms involved are prone to failure and full face dies exhibit rapid wear. Generally, the legibility and abrasion resistance of the resultant marks can be considered to be only fair in quality. Additionally, the marking punch approach is considered a poor performer in marking such surfaces as epoxy coatings and the like.

A technique that has been successful in the marketplace for generating permanent markings upon the surfaces of somewhat malleable materials such as metals and plastics is described by Robertson in commonly-assigned U.S. Pat. No. 4,506,999 entitled "Program Controlled Pin Matrix Embossing Apparatus." Such technique involves a computer controlled dot-matrix marking device utilizing an array of pneumatically-driven tool steel punches to generate human and/or machine readable dot characters or codes. Marketed commercially under the trade designation PINSTAMP®, these devices employ one or more of the noted steel pins in a head assembly which is moved relative to the workpiece being marked to impart permanent dot-matrix characters or machine readable codes into a surface. The system enjoys the advantage of providing characters of good legibility as well as permanence. Additionally, a capability for directional formation of messages or codes is realized.

Robertson et al., in commonly-assigned U.S. Pat. No. 4,808,018, entitled "Marking Apparatus with Matrix Defining Locus of Movement", issued Feb. 28, 1989, describe a dot-matrix character impact marking apparatus which is capable of forming messages or arrays of characters within a very confined region. With this device, a linear array of marker pins is moved by a carriage in a manner defining a predetermined undulating pattern of movement in a vertical raster-type fashion resembling a compressed square wave. This pattern traces the matrix within which individual characters are formed by individual marker pins. Each marking pin within the head assembly of this device is capable of marking more than one complete character for a given traverse of the head between its limits of movement.

Robertson et al., in U.S. Pat. No. 5,015,106, issued May 14, 1991, and entitled "Marking Apparatus with Multiple Line Capability" describe a dot-matrix character impact marking apparatus which achieves a multiple line capability wherein a carriage component carrying one or more marker pin cartridges moves within a singular plane pattern of movement. This multiple line capability advantageously has permitted a broad variety of line configurations, for example in widely spaced positions at a workpiece. The device further employs a retrace method in generating a pattern of marking movement fixed in a predetermined pattern somewhat similar to the formation of a horizontal raster associated with television displays. As before, the device performs in conjunction with a predetermined character defining matrix of pixel positions, each position of the matrix being identified to the system by a timing disk physically maneuvered with the drive components. This apparatus is designed to print dot-matrix characters.

Robertson el al., in commonly-assigned U.S. Pat. No. 5,316,397, entitled "Marking Apparatus With Multiple Marking Modes", filed Jul. 31, 1992, describe a matrix form of character marking utilizing a single plane undulatory motion of the pin cartridge carrying carriage, as well as a capability for the above-described raster form of pattern of movement. This flexibility is achieved through the utilization of software changes as opposed to the insertion of hardware-based timing components and the like. The system disclosed exhibits a capability for full form character formation. This requires the actuation of the marker pins in a manner wherein discrete dots or pixels are not observable, the indentations formed by these pins being so closely nested as to evoke the image of a continuous line forming each character. This device is effective for generating segmented characters or character segments.

There are many human-readable fonts available, but they are have the disadvantage of being slow to print and difficult to recognize using machine readers. The machine reading of dot-matrix characters and codes following their formation may be carried out by a video based system described in U.S. Pat. No. 4,806,741, by Robertson, entitled "Electronic Code Enhancement for Code Readers", issued Feb. 21, 1989.

Certain marking applications of the dot-peen variety call for the use of a single marking pin as opposed to an array of pins. Guidance of this form of single pin typically has been carried out under robotic control. One such system currently is marketed under the trade designation "TMP 6000" by Telesis Technologies, Inc., of Circleville, Ohio, the original assignee of the present application.

Applying spray-marked segmented characters to products for identification purposes is well-known. U.S. Pat. No.

3,584,571, issued to Schmoll, discloses a character generation marking device comprised of a plurality of selectively-actuable spray nozzles mounted in a fixed, predetermined pattern for effecting the placement of line segments on an object. The apparatus disclosed by Schmoll is capable of marking segmented characters with the number of characters being limited to the number of spray nozzles employed. Furthermore, Schmoll requires a great deal of space in which to operate and is incapable of optimizing the path of the print nozzles during the print cycle since the nozzles are fixed in relation to the object being marked. Also, Schmoll neither suggests nor discloses the advantage of optimizing the path of the nozzles in order to speed up the printing cycle.

U.S. Pat. No. 4,218,971, issued to Uhl et al., also discloses an actuation system for a rotating print wheel for printing segmented characters onto moving objects, wherein a rotating print cylinder, housing seven actuable segments, attracts ink from a stationary ink cartridge for transference to said object. However, since the segments are fixed on a print drum, there is no provision for optimizing the movement of the drum based upon the number of segments, i.e., the particular character or character string being printed. Since the movement of the print drum is not alterable based on the characters being printed, the print cycle from one character string to another will not vary. Like Schmoll, Uhl et al. requires a great deal of space in which to operate.

Ideally, there should be a method of applying a segmented code which can be quickly and accurately implemented within a limited space while being both human and machine-readable.

SUMMARY OF THE INVENTION

The concept of segmented fonts has been developed and used to depict alphanumeric characters. A segmented font permits fast printing and easy character recognition by humans and machines. Unlike conventional fonts which define characters by shapes and dimensions, the segmented font characters are defined by a combination of line segments. Each segmented font is based on a template which contains a specific number of line segments. Characters are defined by the presence or absence of these line segments. A minimum of seven segments is required to define numeric characters. In order to generate all alphabetic characters, as well, requires a minimum of 14 segments.

Additional line segments may be added to improve character appearance. Attributes can also be used to further enhance the characters, such as line weight or rounded corners. However, adding line segments or attributes increases printing time and decreases machine-readability.

A segmented font provides many advantages: fast printing, easy reading, and error checking. One base template allows the marking head to use multiple marking members, such as dot-peening pins, spray nozzles, ink jet nozzles or ribbon impact, mounted in fixed adjacency, to simultaneously print multiple, continuous, segmented characters. Machine reading of segmented characters is generally more reliable than reading individual dot-matrix characters or non-segmented fonts since redundant information exists for identifying the presence/absence of line segments. Furthermore, segmented fonts may be expressed mathematically, thus allowing for error checking not normally associated with human-readable fonts.

Each segmented font is based upon a specific base template which contains a distinct number of line segments. A predetermined path is provided that is capable of traversing all line segments of the base template. This base path is then optimized by bypassing that portion of the path which is unnecessary for making up the characters being marked during any one marking cycle.

The segmented font's mathematical definition offers a distinct advantage over image-defined conventional fonts. The specific placement of line segments within the base template creates a fingerprint that uniquely identifies each character. The mathematical representation simplifies the printing and reading algorithms to yield faster print cycles and more reliable character recognition.

A segmented font allows the simultaneous printing of multiple characters while using a continuous print mode. Continuous printing produces fully formed characters as opposed to standard dot-matrix characters. Because segmented fonts use a base template for all characters, all line segments fall along a corresponding, common path. The movement of the marking head can be optimized along this path in the X/Y plane. If multiple marking members are associated with to the printing head, multiple characters can be printed simultaneously with synchronized movement.

Using conventional fonts, printing in a continuous mode is generally restricted to one pin printing one character at a time. However, using base templates, mathematical representations and optimized paths, the segmented fonts utilized by the present invention bypass this restriction. Segmented fonts permit multiple pins to simultaneously print multiple characters in a given data string even during a continuous printing mode. Therefore, printing speed is directly proportional to the number of marking members, such as pins, which are employed in the marking head. By adding a second and third member to the printing head effectively doubles and triples the overall printing speeds, respectively. This increase in speed is limited only by the number of marking members that are employed by the printing head.

One feature of the invention provides a method for marking segmented characters with a marking head having at least one marking member comprising the steps of providing a look-up table of integers corresponding to a set of segmented characters;

providing control for said traversing said marking head in a first path capable of covering each segment of said set of segmented characters;

receiving a string of characters to be marked;

looking up each character of said string within said look-up table and converting each character into an integer;

comparing each of said integers for generating a second, optimal path which bypasses traversing through any unused font segments; and traversing said marking head through said second path while actuating each of said marking members in correspondence with said segments.

Other features of the invention will, in part, be obvious and will, in part, appear hereafter. The invention, accordingly comprises the method proving the combination of elements, and arrangement of steps which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

In the drawings:

FIG. 8 is a chart depicting the binary and hexadecimal values for each character in a 16-segment font set;

The drawings will be described further in connection with the following Detailed Description of the Invention.

DETAILED DESCRIPTION OF THE INVENTION

Figure 1:
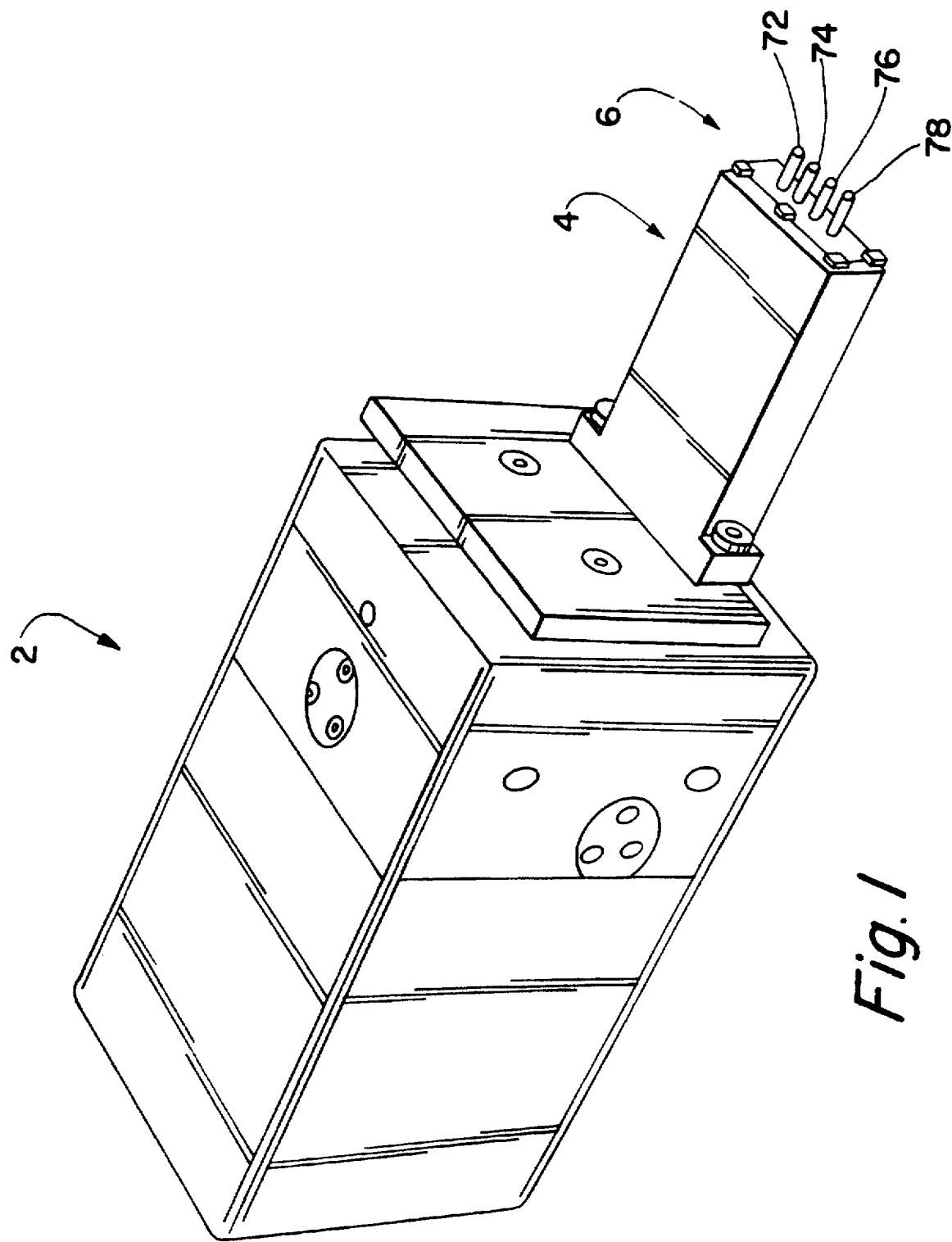
FIG. 1 is a perspective view of a dot-peen marking apparatus having an in-line array of marking pins.

Referring initially to FIG. 1, a dot-peen type of marking apparatus as may be employed by the instant invention is depicted generally at 2. Such marking devices are available commercially as a PINSTAMP® marker available from Telesis Technologies, Inc. of Circleville, Ohio. There, a marking head is shown at 4, housing four individual marking members, in this case hardened pins 72, 74, 76 and 78, shown generally at 6. Such printing technology is described, for example, in detail within U.S. Pat. No. 5,316,397 by Robertson et al., entitled "Marking Apparatus with Multiple Marking Modes", issued May 31, 1994 and assigned in common herewith.

Figure 2:
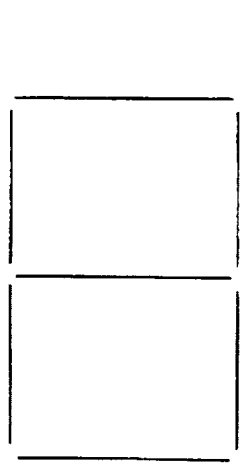
FIG. 2 is a graphical representation of a base template of a segmented font pattern having 7 segments.

Referring next to FIG. 2, a 7-segment base font template is shown. Such 7-segment fonts are useful, and are typically employed in the art, to depict numeric characters only. While having the relative advantage of having a few number of segments to print, the amount of intelligence that can be represented by only seven segments is typically limited to the numbers "0" through "9".

Figures 3, 4:
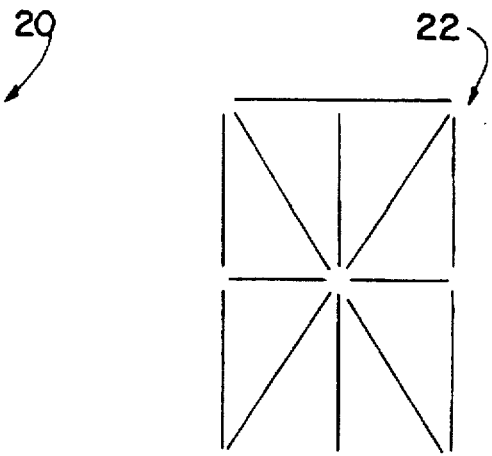
FIG. 3 is a graphical representation of a base template of a segmented font pattern having 14 segments.
FIG. 4 is a graphical representation of a base template of a segmented font pattern having 16 segments.

For printing alphabetic characters, additional line segments are employed in order to convey the additional variations in character forms. It is generally accepted that a segmented font having a minimum of 14 segments, as shown in FIG. 3, generally at 22, is suitable for a full set of alphanumeric characters. However, even a 14-segment font can contain undesirable ambiguities, such as between the letter "S" and the number "5" as well as the letter "B" with the number "8". Such ambiguities may be unacceptable when the data string being marked is to be machine read at some point in the product life cycle.

To avoid such ambiguities, an additional two segments may be employed. A base character template having 16 segments is depicted in FIG. 4, at 24. There it can be seen that the two upper-and lower-most segments shown in FIG. 3 consist of four segments in the 16-segment font. These additional font segments allow some letters, e.g., "S" and "B" to be more readily distinguished from the numbers "5" and "8", respectively, without otherwise materially affecting the human readability of the resultant, printed character string. While the invention is not limited to the use of a 16-segment font, these number of segments are preferable because of their inherent ability to distinguish between certain numeric and alphabetic characters.

Figure 5:
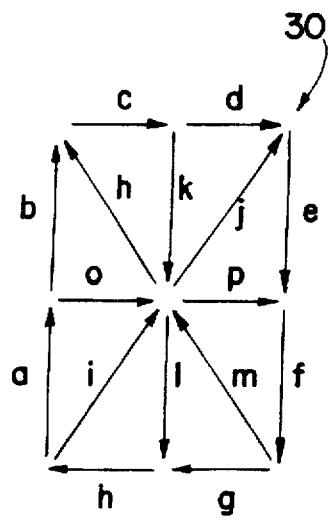
FIG. 5 is a graphical representation of a base template of segmented font pattern having 16 segments depicting a sequence of application to an object.

Referring now to FIG. 5, a single base character template having 16 segments is once again depicted generally at 30, this time with the various segments identified with the lowercase letters, "a" – "p". Each of the various line segments are depicted having an arrow at one end to indicate the direction of pin travel as the mark is being applied to a surface. In the case of a dot-peened segment being applied by a PINSTAMP® marker, indentations are applied in a solid line from the beginning of a line segment to the end of the arrow for that line segment. For the purposes of this disclosure, the letters "a"–"p" associated with the line segments represent a sequence in which the marking head may be manipulated in order to produce the marked characters. However, it is preferable to select a sequence that optimizes, that is, shortens the printing cycle time. Therefore, it is anticipated that the invention includes other sequences of applying the character segments, as well, which may be employed to accomplish this goal.

Figure 10:
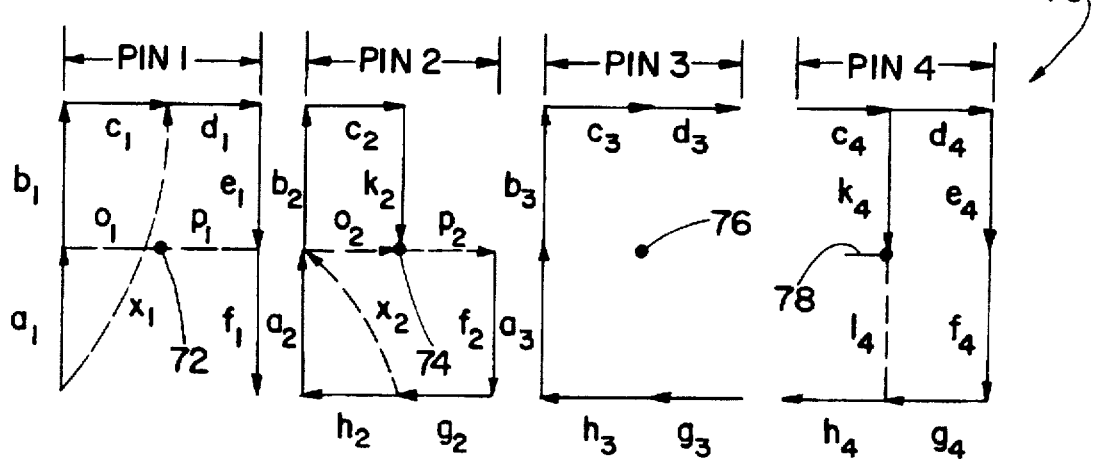
FIG. 10 is a graphical representation of an array of four marking pins, mounted in tandem and moving in an optimized pattern to mark the data string "ABCD".

The 16-segment character 30 in FIG. 4 depicts a single character. As shown in FIG. 1, a dot-peen type of marking head 4 may be comprised of an array of individual marking members 6. Such an array of four marking pins, mounted in tandem, spaced one character apart and marking a four-character string is also depicted in FIG. 10.

Figure 6:
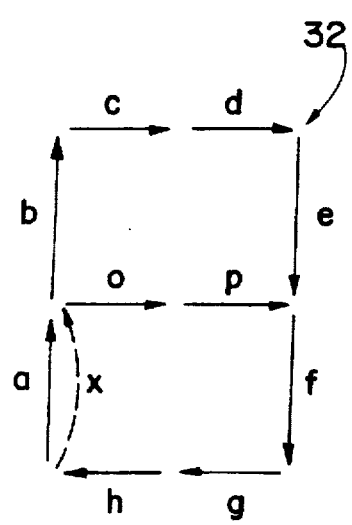
FIG. 6 is a graphical representation of the order of applying segments of a segmented "8" character using a single pin marker, showing an optimized marking printing path.

Referring next to FIG. 6, a 16-segment version of the numeric character "8" is shown at 32 in accordance with the invention. The head travel necessary to form the "8" character 32 has been optimized, that is, unnecessary head travel was eliminated, thus decreasing the printing cycle time. This is demonstrated by following the sequence of printing segments "a" through "h"; skipping steps "i" through "m"; traversing directly to the start of segment "o", (graphically represented by curved, dotted arrow "x"); and then finishing the segmented "8" character 32 by actuating the appropriate marking member along sequence segments "o" and "p". The logic which enables the movement of the marking head to optimize is one feature of the invention and is disclosed more fully in connection with FIGS. 8–10, below.

Figure 7:
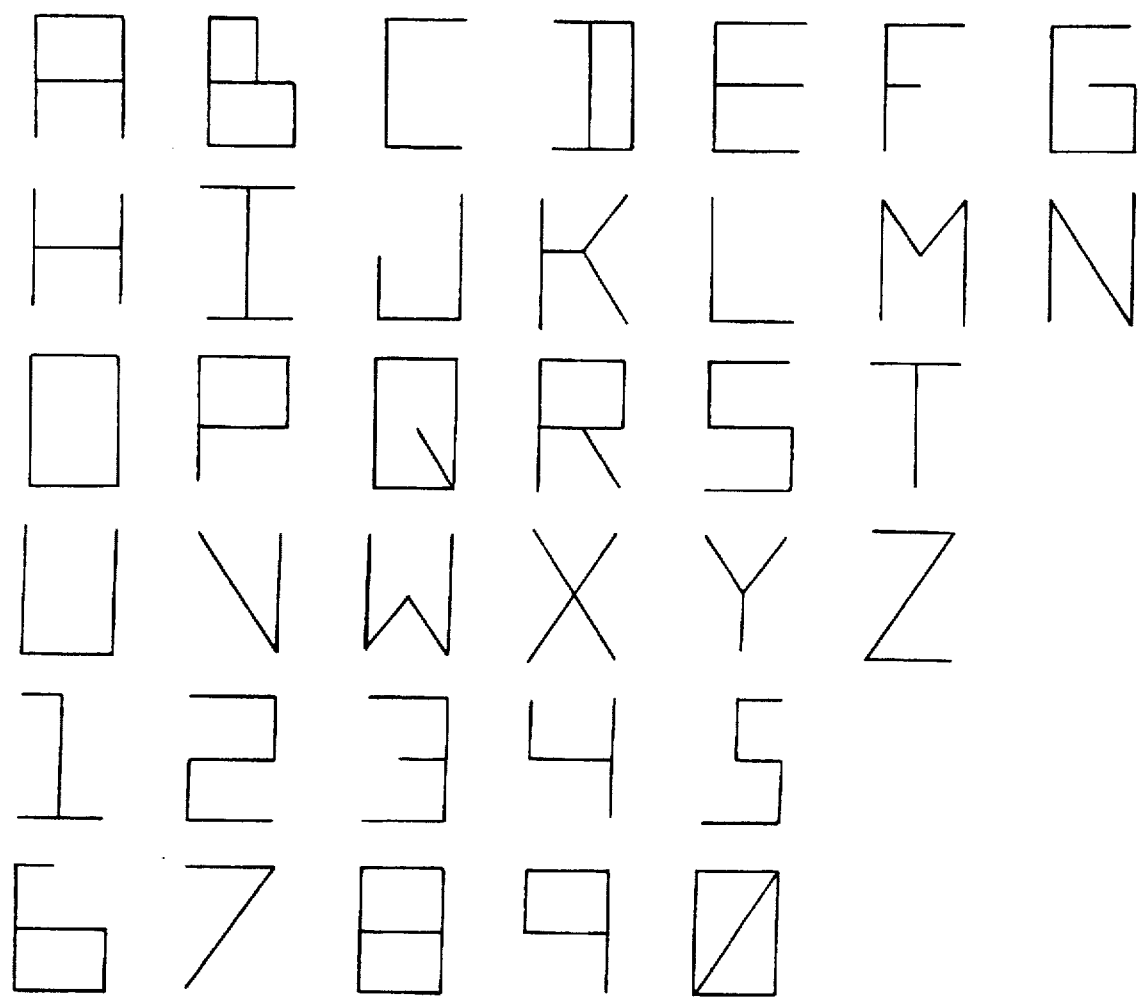
FIG. 7 is a chart of a 16-segment character set.

Looking next to FIG. 7, an alphanumeric chart is provided which depicts the uppercase letters "A" through "Z" and numbers "0" through "9" in 16-segment format. The segmented character font provided has been optimized to for machine reading, as well. Note the physical differentiation between the letters "B" and "S" and the numbers "8" and "5", respectively.

Referring additionally to FIG. 8, each character depicted in FIG. 7 may be represented by an integer whose binary word discloses the presence/absence of particular line segments. The value of the binary word depends on the number of line segments in the base template. Each bit of the binary word corresponding to each integer represents one line segment. Each of the 16 segments in the template, i.e. segments "a" through "p", correspond to a 16-bit binary word. The value is determined by the location of each of the printable line segments within the template. If a character segment is present, i.e., one that is to be printed, the corresponding bit value is "1". If there is no line segment present, the corresponding bit value is "0". Therefore, the placement of line segments within the template yields a unique value for each segmented character in FIG. 8.

For example, the binary word for the character "8", as shown in FIG. 6, would be "1100000011111111", or hexadecimal value of "COFF". The first segment in the template corresponds to the Least Significant Bit and the last segment corresponds to the Most Significant Bit (where LSB=1 and MSB=16).

Figure 9:
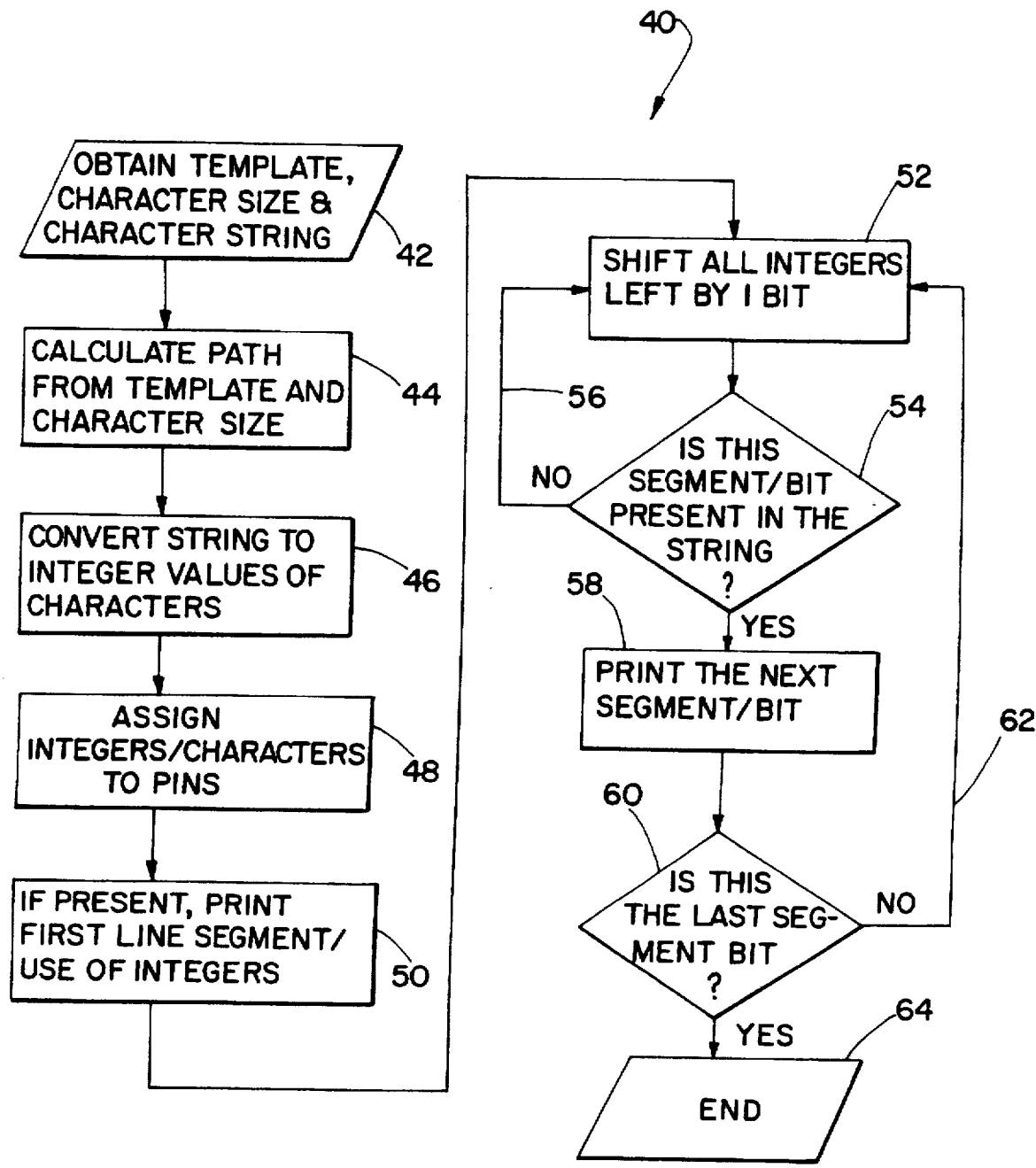
FIG. 9 is a flow chart depicting the print path optimization routine in accordance with the invention.

Moving next to FIG. 9, a flow chart is provided of the control aspects of marking apparatus 2. Although not specifically shown, the control means of the marking apparatus 2 is generally provided by a microprocessor or other computing means, such as a personal computer running the algorithm represented by FIG. 9, with input to the control means being provided by a keyboard, keypad or other data input means. Referring to block 42, the program commences at a point in time where the computer obtains the type of character template to employ, such as a 16-segment character; the size of the character; and the content of the data string to be printed. This information may be manually inputted by an operator or otherwise be provided by another computer in communication therewith. Depending upon the configuration of the marking system, additional data, such as the number of pins 6 in the marking head 4, as well as data relating to their spacing, may be required, as well. With the data input requirements met, the program proceeds to calculate the potential path of the marking pins, represented by block 44. The calculated path of the character string for a given template is common to all marking pins 6 within a head 4 since the travel of each respective pin is lock-stepped with each of the other pins in the in-line pin array. Next, the program, refers to a look-up table, such as depicted in FIG. 8, and converts each character in the inputted data string to its hexadecimal integer equivalent. After conversion of the data string has been accomplished, the program proceeds to assign the resultant number to its corresponding pin which will eventually be used to print that converted character, as represented by block 48.

Once the pins 6 have been assigned their respective characters, the programs begins constructing an optimal head traversing path for the base character template using the character size and the identification of the characters within the string being printed, beginning at block 50. Starting with the LSB of all of the characters in the data string being printed, the program determines whether any of the characters contain the first line segment, in this example, line segment "a". In the case of a 4-pin marking head, the program would determine whether any one of the four characters being printed contained a segment "a". Upon making the determination, the program would control the marking apparatus, as at 2, to mark those segments or not, and then increment to the next function. The program then shifts all integers corresponding to the characters being printed to the left (to the adjacent more significant bit) by one bit, as shown in block 52. Once again, the program queries whether or not the next segment, "b" in this instance, is present in any of the characters being printed, as depicted at block 54. If answered in the negative, the program loops via "no" loop 56 back to block 52 wherein all integers are once again incremented by one bit toward the MSB. If the query at block 54 was answered in the affirmative, the program would proceed to print each of the character segments indicated as being present, as represented by block 58. After printing the appropriate character segments, the program then determines whether this was the last segment to print, as shown in block 60. If answered in the negative, the program once again loops back via "no" loop 62 to block 52 to shift the characters to the left by one more bit toward the MSB. If there are no segments being printed for any given segment in the template, the control of the marking head will cause the marking head to skip over that segment or those segments until it comes to a printable segment. This path-optimizing function is demonstrated in FIG. 6 by traverse path "x" between the end of segment "h" and the beginning of segment "o".

The program will continue looping between blocks 52 and 60 for each of the potential segments ($a_n \ldots p_n$) until it is determined that there are no additional segments to be printed, at which time the program will proceed on to block 64 where it ends. The result of the program is that there is generated an optimized path which traverses only those line segments necessary to construct characters in any given character string being printed. If a particular line segment is not required by any character within a given string, it is not included in the optimum path for that data string and the system saves time by not traversing through an unnecessary path.

For example, in dot-peen applications, such as the Telesis PINSTAMP® marker, as the printing head moves along the path, each pin will be either sequenced to print a line segment, or retracted, if skipping a particular line segment. Referring to FIG. 10, a marking head 4 having four marking pins 6 mounted in tandem, with their respective four selectively actuated pins 72, 74, 76, 78 marking the character string "ABCD", shown generally at 70, in a 16-segment font style. In this example, the printing head has previously been sequenced and marked applicable line segments "a" through "h", and has just completed, "$k_2$" and "$k_4$" in the character string 70. As there were no active character segments for line segments "i" or "j", the marking head control advanced each of the pins 72, 74, 76 and 78 to the beginning of their respective "k" line segments, as represented by curved, dotted line "$x_1$". Each of the pins 74, 76 and 78 was advanced as well, although each advancement is not shown by dotted lines in FIG. 10. This skipping of unnecessary line segments "i" and "j" is one portion of the print path optimization routine. A second, partial optimization takes place when marking head 4 skips unused line segments "m" and "n", as depicted by dotted line "$x_2$". Again, although not shown, each pin 72, 74, 76 and 78 in pin array 6 was advanced to the next active line segment in step with each of the other pins.

As marking head 4 prepares to mark the next segment, "$e_4$", pins 1, 2, and 3 are retracted while pin 78 is continuously actuated to print the final segment of the letter "D". The marking cycle continues until each of the segmented characters, "ABCD" 70 have been completed.

It is to be appreciated that although the printing head described above uses pins to apply marks to a surface that the present invention may also be utilized using spray marking, ink jet printing, ribbon impacting and other similar marking systems and that the above described embodiment is illustrative of merely one of the many possible specific embodiments which can represent applications of the principles of the invention. Thus, it is anticipated that certain changes may be made in the present invention by those skilled in the art without departing from the spirit and scope of the invention. It is intended that all matter contained in the foregoing description shall be interpreted in an illustrative rather than in a limiting sense and that all references cited herein are expressly incorporated by reference.

We claim:

1. A method for marking segmented characters with a traversible marking head having at least one marking member, comprising the steps of:

providing a look-up table of integers corresponding to a set of segmented characters;

providing control for traversing said marking head in a first path capable of covering each segment of said set of segmented characters;

receiving a string of characters to be marked;

looking up each character of said string within said look-up table and converting each character into an integer;

comparing each of said integers for generating a second, optimal path which bypasses traversing through any unused segments of said set; of segmented character and traversing said marking head through said second path while actuating each of said marking members in correspondence with said segments.

2. The method of claim 1 wherein each integer corresponds to a binary word, said word having a number of bits equal to the number of segments in said set of characters being printed.

3. The method of claim 1 wherein the number of bits in each binary word is 16.

4. The method of claim 1 wherein a "1" in said binary word represents the presence of a character segment.

5. The method of claim 1 wherein said set of segmented characters are alphanumeric.

6. The method of claim 1 wherein said marking head is provided with a plurality of marking members mounted in fixed adjacency with one another.

7. The method of claim 6 wherein said marking members are actuated to simultaneously print a plurality of segmented characters corresponding to the number of marking members.

* * * * *